United States Patent [19]

Cittadini et al.

[11] Patent Number: 5,257,791

[45] Date of Patent: Nov. 2, 1993

[54] MAGNETIC GASKET

[75] Inventors: Paolo Cittadini, Luvinate; Adriano Merla, Angera, both of Italy

[73] Assignee: Industrie Ilpea S.p.A., Malgesso, Italy

[21] Appl. No.: 895,678

[22] Filed: Jun. 9, 1992

[30] Foreign Application Priority Data

Jun. 17, 1991 [IT] Italy .................. MI91 A 001650

[51] Int. Cl.⁵ .................. F16J 15/32; E06B 7/19
[52] U.S. Cl. ...................... 277/80; 277/180; 49/478.1; 49/490.1
[58] Field of Search .............. 277/80, 184, 189, 205, 277/207 R, 215, 180; 49/478, 489, 490

[56] References Cited

U.S. PATENT DOCUMENTS

| | | | |
|---|---|---|---|
| 2,958,912 | 11/1960 | Bower et al. | 49/478 |
| 4,240,228 | 12/1980 | Okamura | 277/80 |
| 4,305,230 | 12/1981 | Gerritsen | 49/478 |
| 4,324,826 | 4/1982 | Ginster | 49/490 |
| 4,617,759 | 10/1986 | Pasqualini et al. | 49/489 |
| 4,700,509 | 10/1987 | Merla | 49/478 |

FOREIGN PATENT DOCUMENTS

| | | | |
|---|---|---|---|
| 700559 | 12/1964 | Canada | 49/478 |
| 369799 | 5/1990 | European Pat. Off. | |
| 1108530 | 6/1961 | Fed. Rep. of Germany | 49/478 |
| 21692 | 4/1983 | Italy . | |
| 21837 | 5/1985 | Italy . | |
| 1107502 | 11/1985 | Italy . | |
| 21806 | 5/1986 | Italy . | |
| 894249 | 4/1962 | United Kingdom | 49/478 |

Primary Examiner—William A. Cuchlinski, Jr.
Assistant Examiner—D. DePumpo
Attorney, Agent, or Firm—Foley & Lardner

[57] ABSTRACT

This invention relates to a magnetic gasket particularly suitable for forming a seal between a fixed part and an openable part in regions of curvilinear extension, for example in particular between the body and door of a vehicle, of the type comprising an profiled strip for fixing to the parts and a tubular seat housing a magnetized insert, characterized in that the profiled fixing strip and the tubular seat for the magnetized insert are connected together by an extendable deformable tubular chamber the opposing free walls of which are substantially curvilinear and curved in the same direction.

7 Claims, 5 Drawing Sheets

MAGNETIC GASKET

BACKGROUND OF THE INVENTION

Gaskets for motor vehicles are known, for example, from the Italian patent 1,107,502 and utility model No. 21692 B/83 in the name of the present applicant, which are suitable for forming a seal between the vehicle body and openable parts of the bodywork, such as doors, hatches, the hood and the like, when these items are closed. These gaskets are of the type comprising a deformable profiled strip which is able to be fixed to the vehicle body by being snapped on. The profiled strip has, connected along the straight regions of engagement between the vehicle body and the openable part, a tubular section divided into a pair of separate adjacent chambers, one of which acts as a bellows air chamber and the other as a seat for magnetized material.

These magnetic gaskets represent considerable progress over compression-operated gaskets that do not have a magnetic seal, in terms both of improved sealing and of requiring less pulling action to effect closure.

There is however the technical problem of adapting this type of gasket to the various range of shapes which the engagement region between the fixed and openable parts can assume, particularly in curvilinear regions, and especially when the radius of curvature is small. In very accentuated curvature regions, there are considerable problems relating to deformation and squashing of the magnetic gaskets, which can result in loss of seal, formation of folds and points of discontinuity, or breakage of the gasket after a certain time.

SUMMARY OF THE INVENTION

An object of the present invention is to provide a magnetic gasket motor vehicles and for other systems, in which a seal is required between a fixed part and an openable part, such as refrigerators, freezers, windows, cabins etc., which is substantially universal, i.e. can be easily adapted to every possible shape of the engagement region between the fixed part and openable part on which the gasket is to operate, including regions having accentuated curvature.

A further object is to achieve the above advantage while maintaining the essential characteristic of magnetic gaskets, i.e. easy extensibility along a direction perpendicular to the sealing plane between the fixed part and openable part, so as to compensate for any possible lack of planarity.

These objects are attained according to the present invention by a magnetic gasket particularly suitable for forming a seal between a fixed part and an openable part in regions of curvilinear extension, for example in particular between the body and door of a vehicle, of the type comprising profiled strip for fixing to said parts and a tubular seat housing a magnetized insert, characterised in that said profiled fixing strip and said tubular seat for the magnetized insert are connected together by an extendable deformable tubular chamber the opposing free walls of which are substantially curvilinear and curved in the same direction.

BRIEF DESCRIPTION OF THE DRAWINGS

The characteristics and advantages of the invention will be more apparent from the description of some non-limiting embodiments thereof, which are described hereinafter with reference to the figures of the accompanying drawings, wherein.

DETAILED DESCRIPTION OF THE PREFERRED EMBODIMENT

Figure 1:
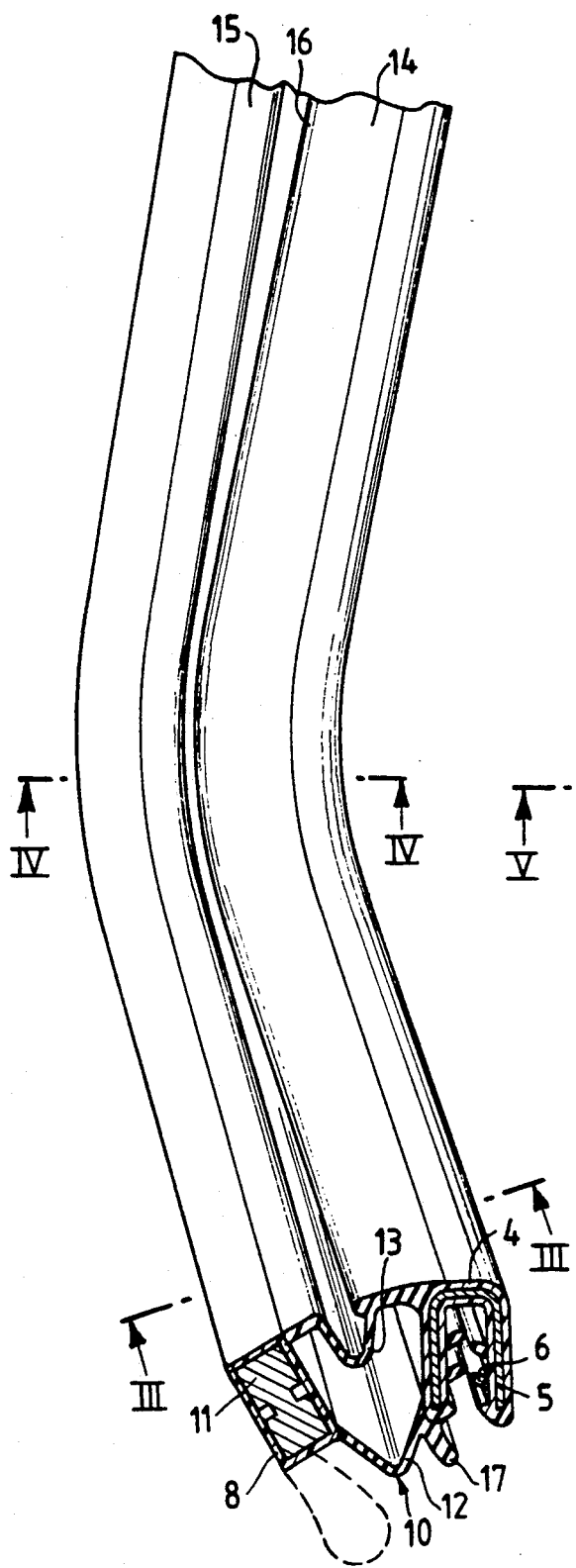
FIG. 1 is a sectional perspective view of a gasket of the invention.

In the drawings, FIGS. 1 to 6 show a gasket suitable for use on a vehicle, for example for sealing between the vehicle body and openable parts such as doors, boot or hood.

Figure 6:
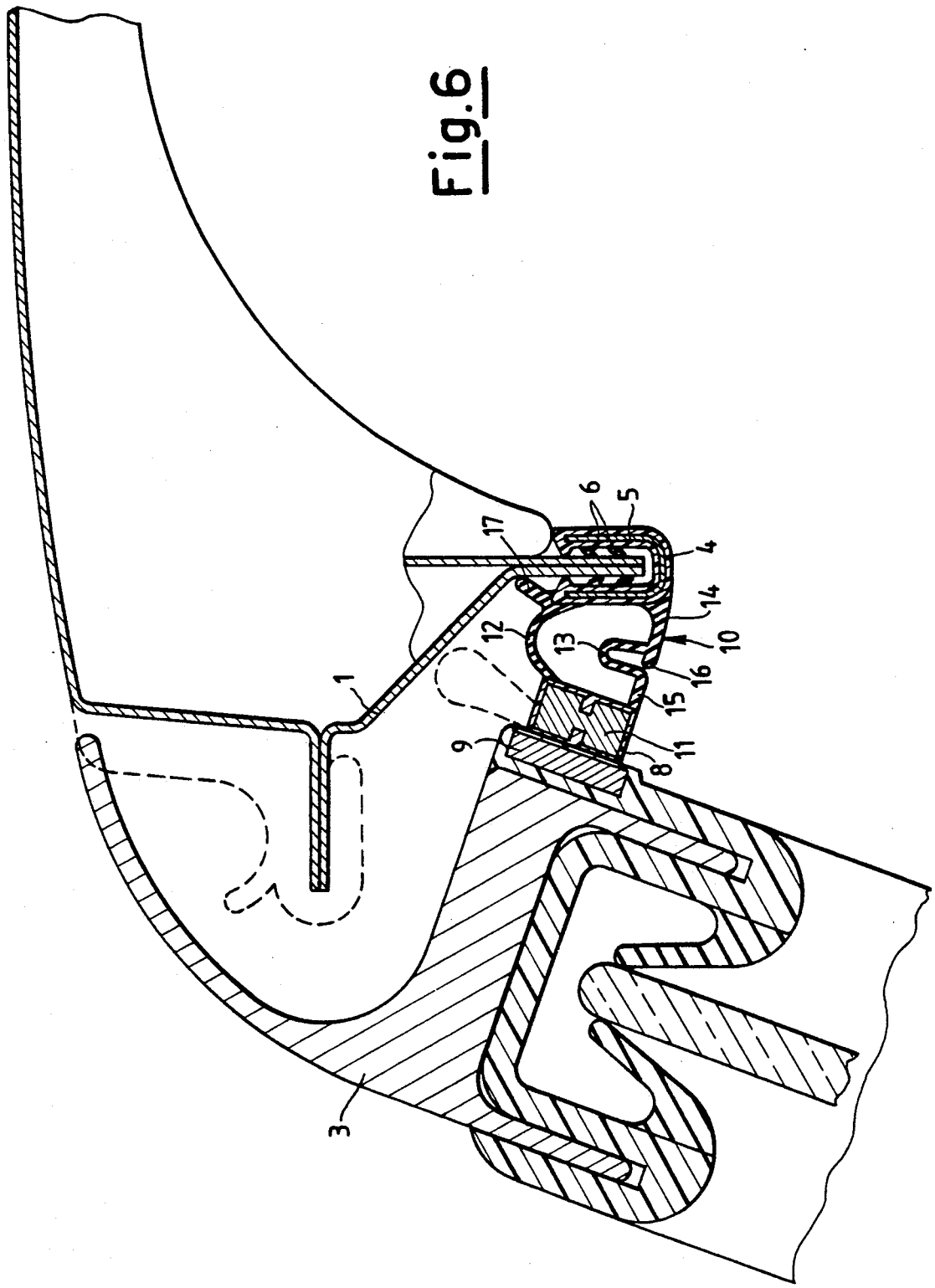
FIG. 6 shows a gasket operationally mounted on a motor vehicle.

With reference to FIG. 6, there is fixed along a frame 1 of a motor vehicle body that cooperates with an access door 3, a snap-on profiled strip 4 having a metal core 5 and a C-shaped cross-section. The strip 4 is basically a ring fixed along the entire extension of the frame 1, on which it is forced and secured by the pressure exerted by the fins of the metal core, adherence being completed by the action of saw-tooth projections 6 which act on the surface of the vehicle body frame. Along the angular and curvilinear regions of the frame 1, the profiled strip 4 follows the shape because of its capacity to deform and to assume a torus development.

In a direction parallel to, but on the opposite side to the profiled strip 4, there extends in the direction of the door 3 a tubular seat 8 housing magnetized material, such as a plastoferrite bar 11, which is able to act as a magnetic pole against a counter-pole formed by the door 3 itself, made if the door 3 is formed of ferromagnetic material, or by a suitable ferromagnetic plate 9 located on the door in a position facing the bar 11, if the door is for example, made of plastic material.

The snap-on strip 4 and the seat 8 containing the magnetic insert are connected together by an interposed tubular chamber 10, which is elastically yieldable and deformable so that it can extend as a bellows particularly in the direction perpendicular to the surface of contact with the counter-pole. The configuration of the chamber 10, when viewed in cross-section, is as follows: the two opposing walls 12 and 13, when not urged by the snap-on strip or the seat for the magnetic insert, are of essentially curvilinear and parallel shape, in the sense defined hereinafter. The wall 12 is that which faces vehicle body frame 1, and is hence that which is on the outside when operationally mounted. The wall 13 is that which is on the inside when in the operating position. The two walls 12 and 13 are therefore both curved towards the outside of the curve which the gasket assumes within the curvilinear engagement region. The wall 13 is most curvilinear in its central region, whereas in its side portions 14 and 15, connected to the snap-on strip 4 and to the magnetic insert seat 8, respectively, it is of rectilinear extension.

From the rectilinear portion 14 there extends a rib 16 which acts as a spacer between the two side portions 14, 15. From the outer wall 12 there extends a corresponding spacer 17 in the direction of the frame 1.

Figure 2:
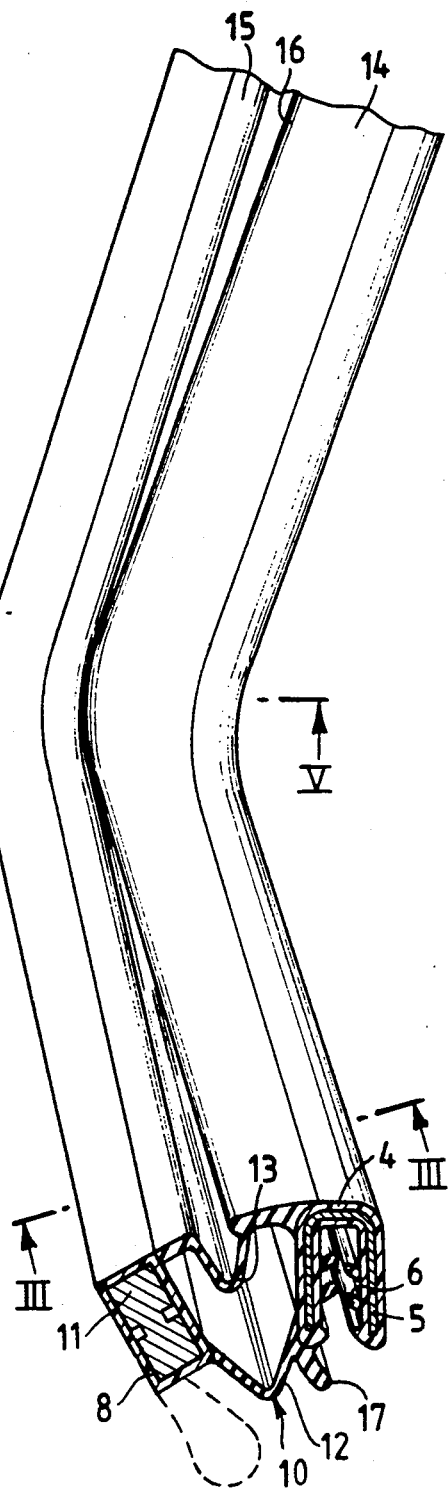
FIG. 2 is a view analogous to that of FIG. 1 showing the same gasket in a different operating position.
Figure 3:
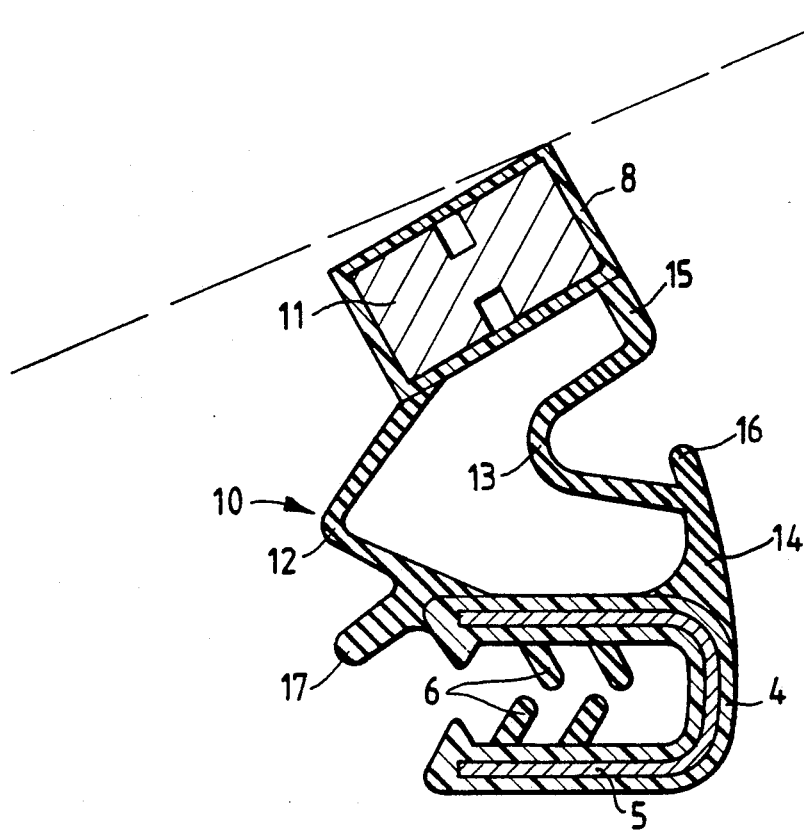
FIGS. 3, 4, and 5 are three sectional views of the gasket of FIGS. 1 and 2 at three different points, taken on the lines III—III, IV—IV and V—V of said FIGS. 1 and 2 respectively.
Figure 4:
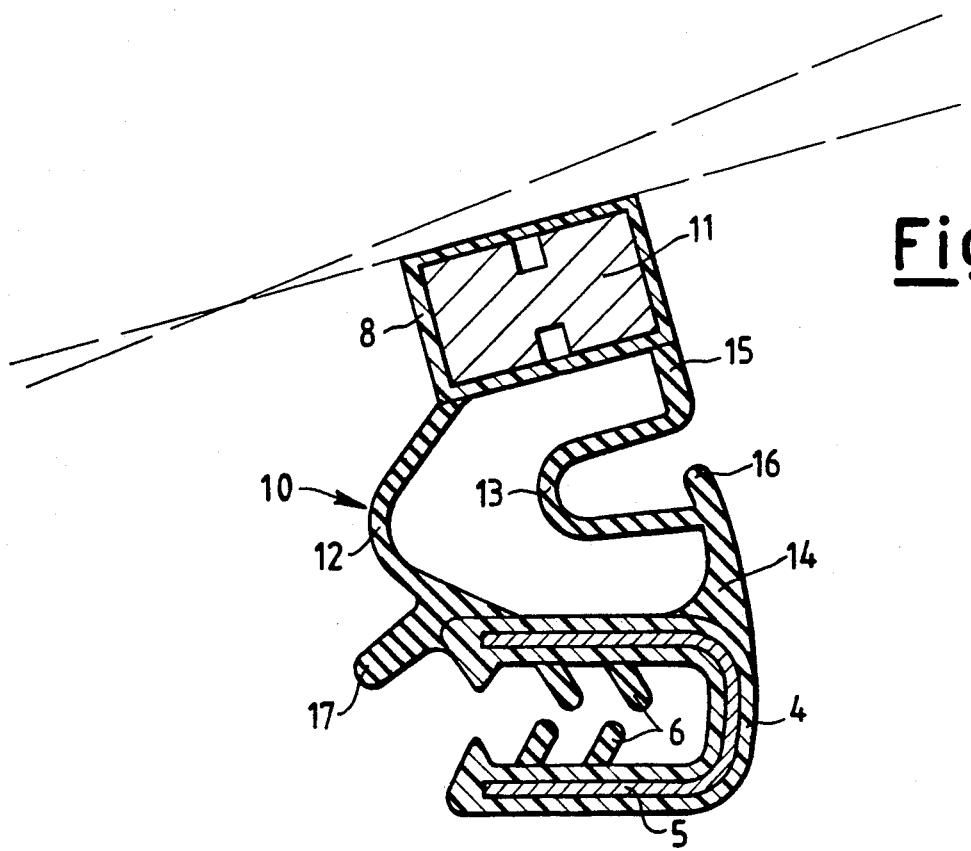

FIGS. 1 to 5 show the performance of the gasket according to the invention within the curvilinear engagement regions of the vehicle body. FIG. 3 shows the form of the cross-section through the gasket in the region III—III in which in practice there is no deformation of the gasket, so that this cross-section corresponds basically to the nominal cross-section. FIG. 1 shows a gasket deformation in the region IV—IV because of a different radius of curvature of the profile of the engagement region. The corresponding gasket cross-section shown in FIG. 4, when compared with the gasket cross-section shown in FIG. 3, shows a slackening, with flattening, of the outer wall 12 and a more accentuated curvature of the inner wall 13, with the approach of the portions 14 and 15 toward each other.

Figure 5:
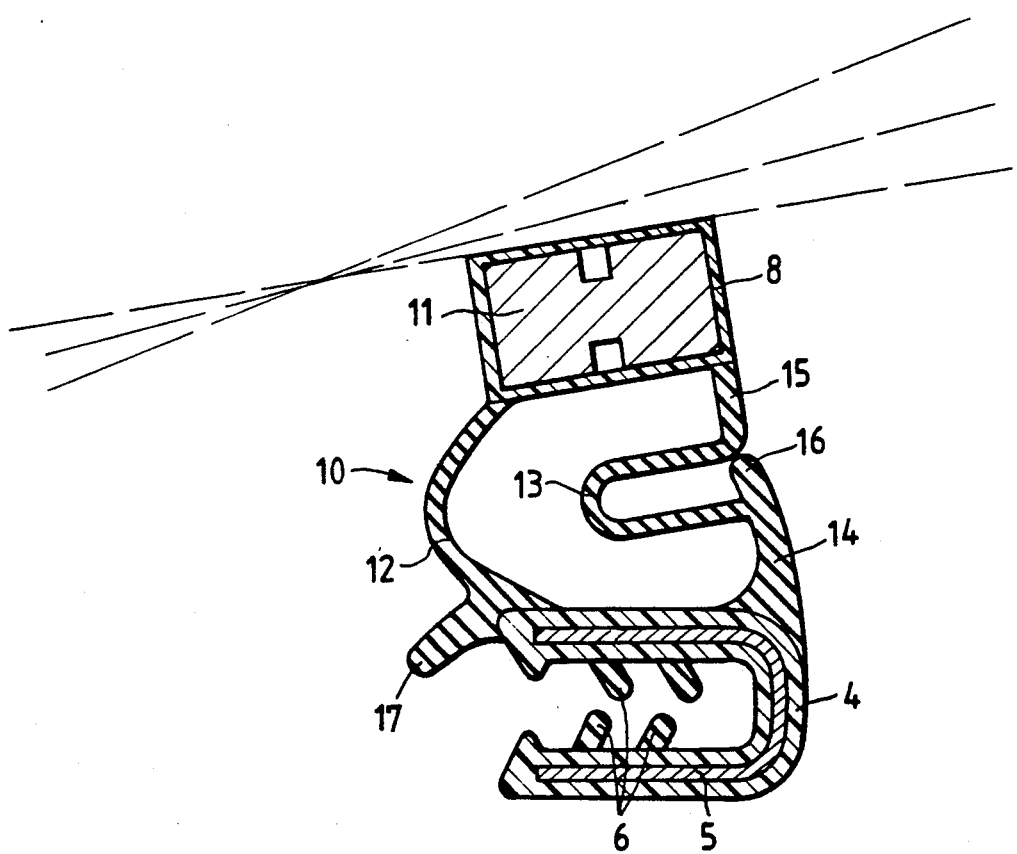

In a region, such as the region V—V of FIG. 2, in which there is a further reduction in the radius of curvature of the profile in the engagement region, the corresponding gasket cross-section shown in FIG. 5 shows a further slackening and flattening out of the outer wall 12 and a more accentuated curvature of the inner wall 13, with the portions 14 and 15 making contact via the rib 16.

As will be apparent, the effect is therefore to compensate the deformations which can occur in any engagement region of the gasket by virtue of radius of curvature variations at the points concerned, so that the gasket surface always adheres perfectly to the engagement region independently of the corresponding radius of curvature, even if this corresponding radius of curvature is small. At the same time a sufficient gasket extendability is preserved in a direction perpendicular to the surface of contact with the counter-pole. This extendability enables the gasket to operate correctly, to compensate for any planarity inaccuracies in the contact surface, and to ensure a seal along the entire outline.

Figure 7:
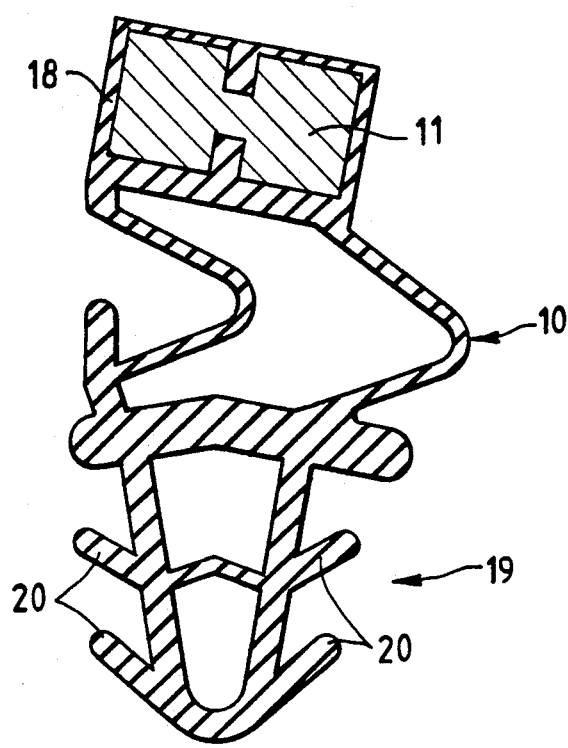
FIGS. 7 and 8 are sectional views of two further embodiments of the gasket according to the invention.
Figure 8:
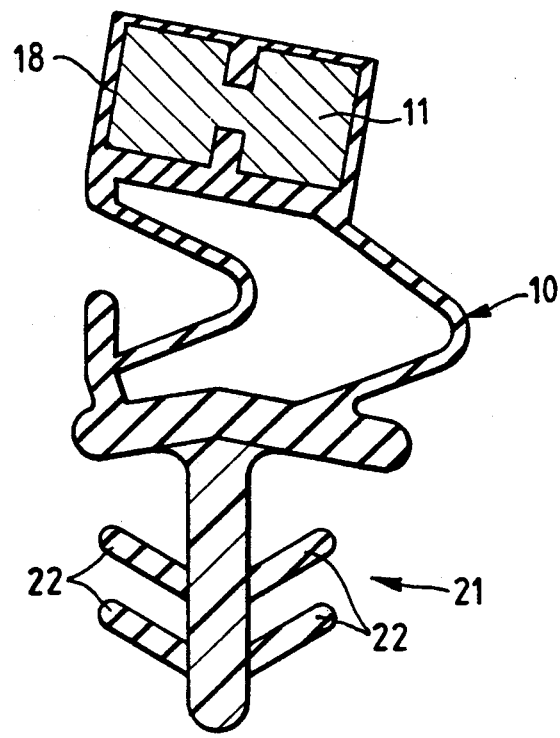

For applications relating to refrigerator, freezer and similar doors, and to windows, door frames, cabins etc., the gasket can take the form of that shown in FIGS. 7 and 8.

FIG. 7 shows the cross-section through a monoextruded gasket of soft elastic material such as plasticized PVC, thermoplastic rubber or a traditional vulcanized elastomer housing a magnetic insert 11 in a thin tubular section 18.

The fixing element is in this case a fishbone section comprising a body 19 with fins 20 for insertion into the recess in the refrigerator door abutment, or door or window frame. This recess can be formed by thermoforming in the case of a refrigerator or by milling in the case of door and window frames, with rounded corners to avoid the need for welding. The gasket can be completed by a 90° butt weld to seal at the junction point.

FIG. 8 shows a coextruded gasket in which the coupling foot consists of the rigid section 21 having fins 22 of the same soft material as the rest of the gasket. The combination of rigid and soft material can be in the form of traditional two-hardness vulcanized elastomer, rigid and soft PVC, or coextrudable thermoplastic rubber and rigid material, hence achieving perfect adhesion between rigid and soft materials (such as thermoplastic olefin rubber and polypropylene, ABS and thermoplastic styrene or polyester rubber).

In both of the cases shown in FIGS. 7 and 8, the extendable tubular chamber 10 has the characteristic structure described for in the preceding examples. The operation of these gaskets of the invention is hence essentially similar to that already described with reference to FIGS. 1 to 6.

In the case of a refrigerator cabinet or the like, the aforegoing can be extended to this application in that although it is known in the art to use magnetic gaskets welded at the corners so that they follow a rectangular shape which is widespread in practice, it is possible, by suitably shaping the recesses which are to receive the coupling parts of the gasket, to apply a gasket having corners of a suitable radius of curvature so that instead of comprising four 90° welds at the corners it has only one 180° butt weld. This simplifies the refrigerator gasket and results in reduced costs.

The gasket of the present invention can also be analogously applied to door and window frames, verandas or general closures in the building industry when adaptation to a certain curvature of the closure edge is required, as for example, in the case of doors or windows which are not completely rectangular but instead have a circular upper finish. In these cases the parallel curved-wall shape of the bellows provides the necessary curvature to the extruded section. This concept is applicable for example to the magnetic gaskets described in Italian utility model Nos. 21837 B/85 and 21806 B/86 of the present applicant.

In addition, in the described fields of application, the facility for following curvatures gives the stylist considerable freedom in designing the finished object, which would otherwise be dependent upon 90° or other corner welds.

We claim:

1. A magnetic gasket for forming a seal between a fixed part and an openable part, the fixed and openable parts, when in a closed position, defining an engagement region therebetween having at least one curved section, said gasket comprising:

a profiled strip fixed to one of said fixed and openable parts;

a tubular seat housing;

a magnetized insert disposed in said tubular seat housing;

a substantially extendible, deformable tube having an extendable deformable tubular chamber therein and first and second substantially curvilinear walls each having a curved portion, wherein said curved portion of said first curvilinear wall and said curved portion of said second curvilinear wall are curved in a same direction and said deformable tube connects said profiled strip to said tubular seat housing;

wherein, when said openable and fixed parts are in said closed position, 1) a space is defined in said fixed part, 2) said first curvilinear wall is an inner wall relative to said space and said second curvilinear wall is an outer wall relative to said space, 3) said gasket is disposed in said engagement region, and 4) said first curvilinear wall has first and second rectilinear portions between which said curved portion of said first curvilinear wall is disposed;

wherein a spacer extends from at least one of said first and second rectilinear portions toward the other of said first and second rectilinear portions.

2. A gasket as claimed in claim 1, wherein one of said first and second curvilinear walls has a spacer thereon.

3. A gasket as claimed in claim 1, wherein said profiled strip and said tubular seat housing are separate parts, and further comprising an adhesive which connects said profiled strip and said tubular seat housing to each other.

4. A gasket as recited in claim 1, wherein said profiled strip, said tubular seat housing, and said deformable tube are molded as a single piece.

5. A gasket as recited in claim 1, wherein said profiled strip, said tubular seat housing and said deformable tube are coextruded as a single piece.

6. A magnetic gasket for forming a seal between a fixed part and an openable part, the fixed and openable parts, when in a closed position, defining an engagement region therebetween, said gasket comprising:

a profiled strip fixed to one of said fixed and openable parts;

a tubular seat housing;

a magnetized insert disposed in said tubular seat housing;

a substantially extendible, deformable tube having an extendable deformable tubular chamber therein and first and second substantially curvilinear walls each having a curved portion, wherein said curved portion of said first curvilinear wall and said curved portion of said second curvilinear wall are curved in a same direction and said deformable tube connects said profiled strip to said tubular seat housing;

wherein, when said openable and fixed parts are in said closed position, a space is defined in said fixed part, said first curvilinear wall is an inner wall relative to said space and said second curvilinear wall is an outer wall relative to said space, and said gasket is disposed in said engagement region;

wherein said fixed and openable parts have a plurality of curved sections of varying curvature such that said engagement region has at least first and second curved regions, said first curved region has a greater curvature than said second curved region, and said first curvilinear wall conforms within said engagement region such that said curved portion of said first curvilinear wall has a greater curvature at a point corresponding to said first curved region than at a point corresponding to said second curved region.

7. A gasket as recited in claim 6, wherein said first curvilinear wall has first and second rectilinear portions between which said curved portion of said first curvilinear wall is disposed and wherein a spacer extends from at least one of said first and second rectilinear portions toward the other of said first and second rectilinear portions.

* * * * *